(12) United States Patent
Israel et al.

(10) Patent No.: US 10,474,966 B2
(45) Date of Patent: Nov. 12, 2019

(54) DETECTING CYBER ATTACKS BY CORRELATING ALERTS SEQUENCES IN A CLUSTER ENVIRONMENT

(71) Applicant: Microsoft Technology Licensing, LLC, Redmond, WA (US)

(72) Inventors: Moshe Israel, Ramat-Gan (IL); Dotan Patrich, Rishon LeZion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 15/444,124

(22) Filed: Feb. 27, 2017

(65) Prior Publication Data

US 2018/0248893 A1  Aug. 30, 2018

(51) Int. Cl.
| | | |
|---|---|---|
| *G06F 21/55* | (2013.01) | |
| *G06N 20/00* | (2019.01) | |
| *H04L 29/08* | (2006.01) | |
| *H04L 29/06* | (2006.01) | |

(52) U.S. Cl.
CPC ........... *G06N 20/00* (2019.01); *G06F 21/554* (2013.01); *H04L 63/145* (2013.01); *H04L 63/1433* (2013.01); *H04L 67/10* (2013.01)

(58) Field of Classification Search
CPC . G06F 21/552; G06F 21/577; H04L 63/1425; H04L 63/1433
See application file for complete search history.

(56) References Cited

U.S. PATENT DOCUMENTS

| 7,779,467 B2 | 8/2010 | Choi et al. |
|---|---|---|
| 7,991,726 B2 | 8/2011 | Zhou et al. |
| 2004/0015719 A1 | 1/2004 | Lee et al. |
| 2005/0251860 A1* | 11/2005 | Saurabh ............... G06F 21/552 726/23 |
| 2014/0157405 A1 | 6/2014 | Joll et al. |
| 2015/0074806 A1 | 3/2015 | Roundy et al. |

(Continued)

OTHER PUBLICATIONS

Bahareth, et al., "Constructing Attack Scenario using Sequential Pattern Mining with Correlated Candidate Sequences", In Journal of The Research Bulletin of Jordan ACM, vol. II, Issue (III), Apr. 2013, pp. 1102-1108.

(Continued)

*Primary Examiner* — Dao Q Ho

(74) *Attorney, Agent, or Firm* — Workman Nydegger

(57) ABSTRACT

Providing network entities with notifications of attacks on the entities. A method includes collecting alerts from a plurality of network entities in a cluster computing environment. Alerts are grouped into heterogeneous groups of alerts. Each group includes a plurality of different types of alerts. Each alert has corresponding properties, including at least one property identifying the type of alert. Each group of alerts corresponds to a timeline of alerts for a particular entity. Groups of alerts that correspond to a valid cyber-kill chain are identified. Different groups of alerts that correspond to a valid cyber-kill chain are correlated into clusters of groups of alerts by correlating the types of alerts and corresponding properties. At least one cluster is identified as having some characteristic of interest. Entities corresponding to groups of alerts in the cluster are notified of the characteristic of interest.

20 Claims, 10 Drawing Sheets

(56) References Cited

U.S. PATENT DOCUMENTS

| | | |
|---|---|---|
| 2015/0244732 A1 | 8/2015 | Golshan et al. |
| 2015/0264077 A1 | 9/2015 | Berger et al. |
| 2016/0196728 A1 | 7/2016 | Suman et al. |
| 2018/0032724 A1* | 2/2018 | Tang .................... H04L 41/142 |

OTHER PUBLICATIONS

Ma, et al., "Real-Time Alert Stream Clustering and Correlation for Discovering Attack Strategies", In Proceedings of Fifth International Conference on Fuzzy Systems and Knowledge Discovery, Oct. 18, 2008, pp. 379-384.

Stroeh, Kleber, "An approach to the correlation of security events based on machine learning techniques", In Journal of Internet Services and Applications, vol. 4, Issue 7, Mar. 11, 2013, pp. 1-6.

Mirheidari, et al., "Alert Correlation Algorithms: A Survey and Taxonomy", In Proceedings of the 5th International Symposium Cyberspace Safety and Security, Nov. 13, 2013, 15 pages.

\* cited by examiner

DETECTING CYBER ATTACKS BY CORRELATING ALERTS SEQUENCES IN A CLUSTER ENVIRONMENT

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems, or other distributed computing systems.

In distributed computing systems, such as cloud based systems, or even distributed on-premises systems, attackers will attempt to attack various computing systems within a cloud based system or other distributed computing system. There can be a constant barrage of attack attempts. Often, the attackers do not try to obfuscate their actions and intentions. Rather, given the sheer number of attempts to attack computing system, eventually an attacker will succeed in penetrating and compromising a computing system within the distributed computing system.

These constant attacks generate certain types of alerts in the computing systems. However, there is also a large number of background alerts that are generally simple benign noise within the distributed computing system. The combination of alerts generated from attackers attempting to attack systems within the distributed computing system, along with the other alert noise is known generally as Internet radiation.

While performing an attack, the attacker will typically need to perform several steps of a kill-chain. A kill-chain is a set of actions that results in a computing system being compromised. For example, one example of kill-chain stages may include getting access to a machine, installing malware on the machine or reading confidential data.

To detect a certain attack, a security analyst will need to go through all of the security alerts, understand them and attempt to determine which ones are related one to each other. Then, the security analyst will need to map each relevant alert to one of the steps in the kill-chain, and only then, they may be able to "guess" whether a set of alerts is indicative of an attack. Typically, it is not an easy task and the decision whether alerts are indicative of an attack or benign by the security analyst is based on experience and hunches.

Given that the security analyst is "flooded" by a large number of alerts, including valid alerts as well as benign alerts, it is often hard to understand which alerts are the result of valid attacks and which alerts are false positive alerts based on benign activities occurring within a system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a cluster computing environment. The method includes acts for providing network entities with notifications of attacks on the entities. The method includes collecting alerts from a plurality of network entities in a cluster computing environment. Alerts are grouped into heterogeneous groups of alerts. Each group includes a plurality of different types of alerts. Each alert has corresponding properties, including at least one property identifying the type of alert. Each group of alerts corresponds to a timeline of alerts for a particular entity. Groups of alerts that correspond to a valid cyber-kill chain are identified. Different groups of alerts that correspond to a valid cyber-kill chain are correlated into clusters of groups of alerts by correlating the types of alerts and corresponding properties. At least one cluster is identified as having some characteristic of interest. Entities corresponding to groups of alerts in the cluster are notified of the characteristic of interest.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In the following examples, a cloud service is illustrated as a distributed service, but it should be appreciated that in other embodiments other distributed services, including on-premises systems, or hybrid systems including cloud elements in combination with on-premises components, may use aspects of embodiments of the invention as illustrated herein.

In a distributed computing environment, security alerts for attack campaigns happen frequently (perhaps even thousands of times in a given day), originate from various sources, and employ a variety of techniques. In most cases, these attacks do not succeed, and are repeated over all services exposed to the Internet. In addition, often the attacker's goal is to gain a foothold on a service and use it for malicious activity, as a beach head to infiltrate other services or networks. Thus, these attacks will essentially yield a high rate of seemingly similar alerts on failed or incoming attacks for cloud or other services. This can make it difficult to identify successful attack campaigns amongst the noise of all the failed attempts which will also generate a high number of alerts. Additionally, it can be difficult to correlate between alerts once an attacker has been identified after gaining access to a service.

Previously, to detect a certain attack campaign, the security analyst examined all of the security alerts, understood them and determined which ones are related one to each other. Most of the times it was not an easy task and the decision as to whether an alert was related to an attack or not was affected by the security analyst experience and intuition. To make matters even harder for the security analyst, looking at alerts, the analyst would often get similar alerts for various cloud services that ran and the security analyst would need to cross correlate those alerts to see if attacks were repeating on several cloud services and if they could be attributed to the same attack campaign.

Some embodiments described herein leverage distributed computing system knowledge by learning patterns of attacks and then alerting on new instances of these patterns. This is done by generating alerts; collecting alerts of all distributed computing system services within a system; grouping alerts into groups of alerts; and clustering different groups of alerts by: comparing between the sequence and content of the alerts in the groups of alerts, and determining which patterns are repeating. Further, embodiments may evaluate statistical models to determine if an alert pattern, within some statistical significance, represents an attack. Various components on the distributed network can then be notified when an attack pattern is detected. This can create an improved more secure system as attack patterns can be detected and corresponding attacks can be mitigated. The following now illustrates details with respect to some embodiments of the invention as illustrated herein.

Figure 1:
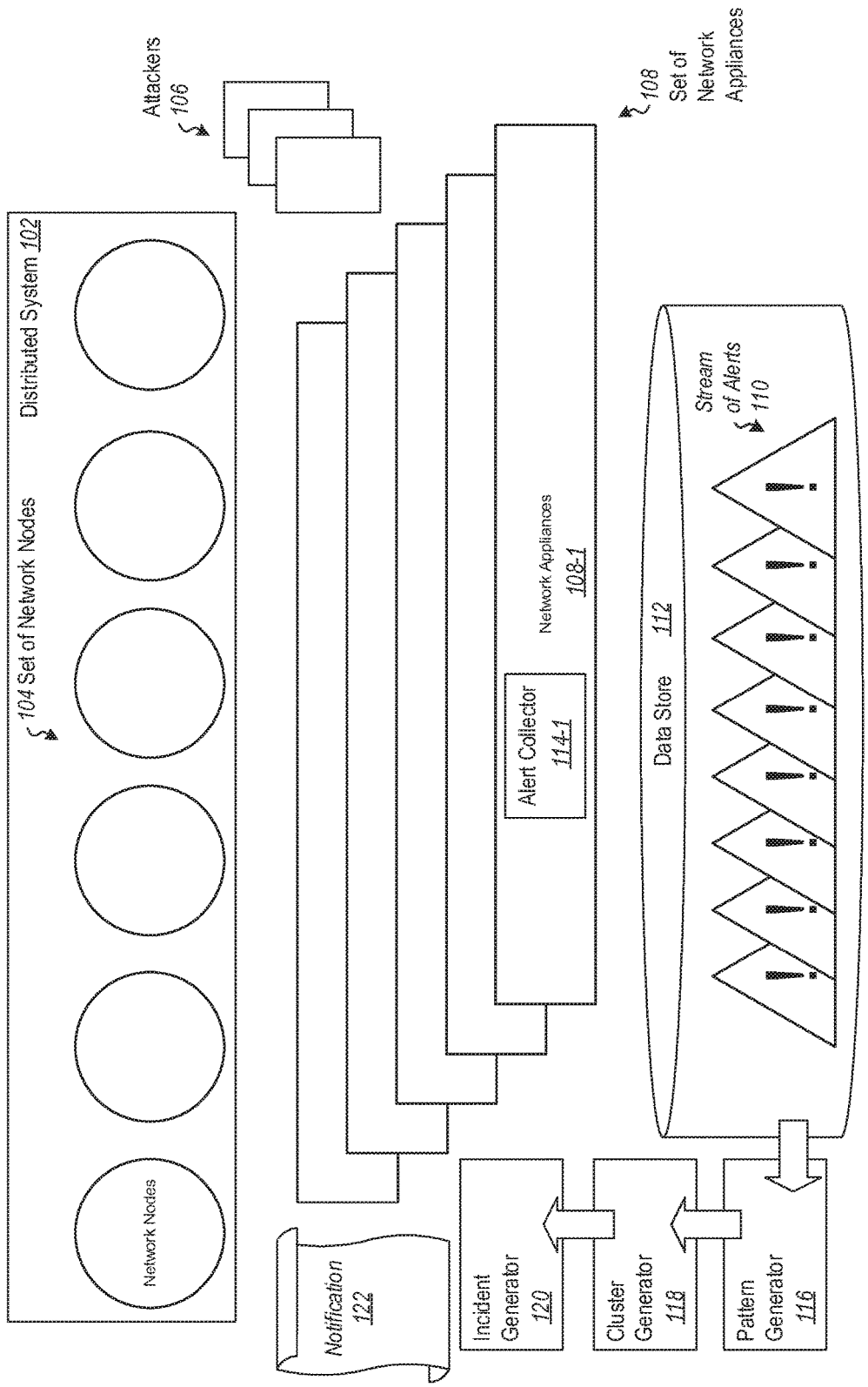
FIG. 1 illustrates a cluster system and system for collecting alerts, grouping alerts, clustering groups and providing notifications.

Reference is now made to FIG. 1. FIG. 1 illustrates a distributed system 102. The distributed system 102 includes a set of network nodes 104. For example, each of the nodes in the set of network nodes maybe one or more of a physical machine, virtual machine, a virtual network, or other entity in a distributed system 102.

Attackers 106 may attempt to attack nodes in the set of network nodes 104. The attackers 106 may be entities within the distributed system 102, such as compromised network nodes, or entities outside of the distributed system 102, such as computing entities on other systems that have been infected with malicious software configures the other systems to attack networked computing systems. FIG. 1 further illustrates a set of network appliances 108. The set of network appliances 108 are configured to report alerts on network services such as the alerts illustrated in the stream of alerts 110. Network appliances that report alerts are not limited to be separate appliances than the entities are being alerted on. The alert can also originate from a security solution installed on the entities (104). For example, an antimalware solution installed on a virtual machine may be implemented as network appliances. Alerts in the stream of alerts 110 may be generated by the network appliances 108 based on various activities occurring on the network nodes in the set of network nodes 104. For example, alerts may be generated indicating attempts to access certain ports of network nodes by an Intrusion Detection System (IDS) that monitors all incoming network traffic to a network entity and alert whenever a suspicious network pattern is found. Alerts may be generated indicating an unusually high number of attempts to access a network node by a remote entity. Alerts may be generated indicating unusual network node access requests. Alerts may be generated indicating attempts to remotely install software on network nodes. Alerts may be generated indicating attempts to read data from network nodes. Etc. Each alert generate will be of a particular type and will have particular properties associated with it. For example, the alert type may be an attempted brute force attack. The properties may include IP addresses of the attacking computer, frequency of access attempts, etc. Different types of alerts, reported by different security solution, may include different properties. Examples embodiments may include, but are not limited to, IP addresses, user accounts, file names, file hashes, running process details etc The alerts in the stream of alerts 110 are stored in a data store 112 such as a database or other data store. In particular, an alert collector 114-1 at network appliances 108-1 can collect alerts and store them in the data store 112. The alerts stored in the data store 112 may include various alerts including historical alerts according to some parameter defining the historical characteristic of alerts. For example, a user specified parameter at the alert collector 114-1 may indicate that the system should store a given number of hours of alerts, days of alerts, weeks of alerts, months of alerts, or some other historical parameter. Note that each of the network appliances in the set of network appliances 108 may include alert collectors configured to gather alerts and to store them in the data store 110. In some embodiments, the alerts may be stored as timelines of alerts in the data store 112.

Figure 2:
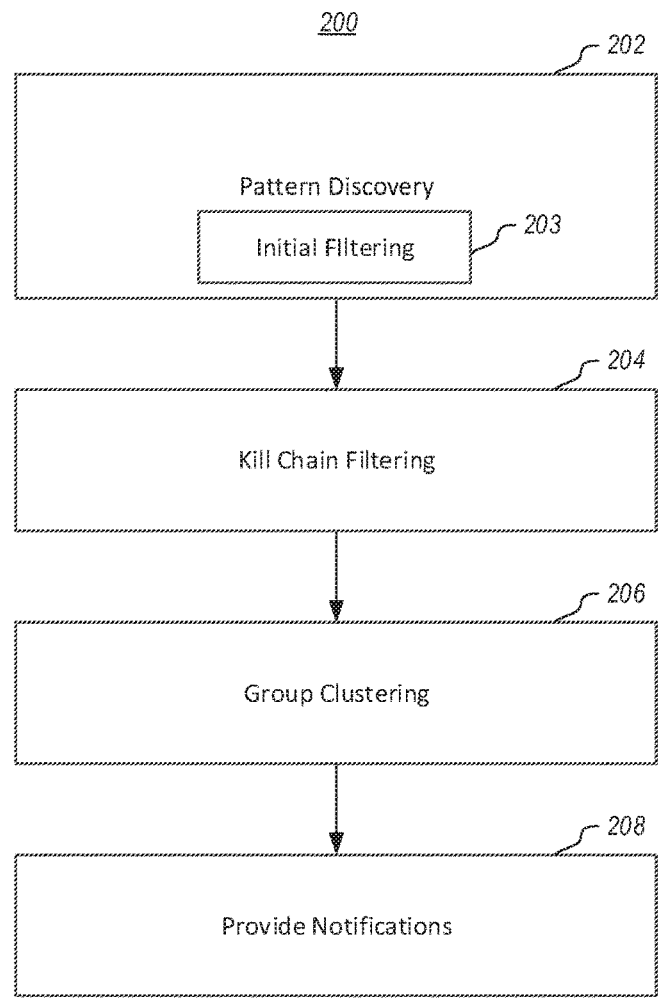
FIG. 2 illustrates a flow for providing notifications of attacks.

Referring now to FIG. 2, a flow 200 is illustrated. The details of the flow 200 will be addressed below, however in general some embodiments may be implemented where pattern discovery is performed by the pattern generator 116 (FIG. 1) as illustrated at 202 (FIG. 2). Pattern discovery involves the discovery of various alert patterns into groups of alerts. In some embodiments, pattern discovery 202 may include steps for performing initial filtering as illustrated at 203. Initial filtering may remove various groups of alerts and/or not permit certain groups of alerts from being formed based on various criteria and conditions as will be explained in more detail below.

Once a number of groups of alerts have been identified, the flow 200 illustrates kill-chain filtering at 204, as will be illustrated in more detail below in conjunction with the description of FIG. 5. Kill-chain filtering removes groups of alerts that do not meet certain criteria for establishing a valid cyber-kill-chain.

Once kill-chain filtering has been performed, as illustrated at 206, group clustering can be performed. In particular, various groups are clustered and statistical analysis can be performed on the various clusters to attempt to identify groups of alerts that are associated with attacks on the network. Additional details are illustrated in conjunction with the description of FIG. 6 below.

Finally, FIG. 2 illustrates that the group clustering can be used to provide notifications as illustrated at 208.

Figure 3:
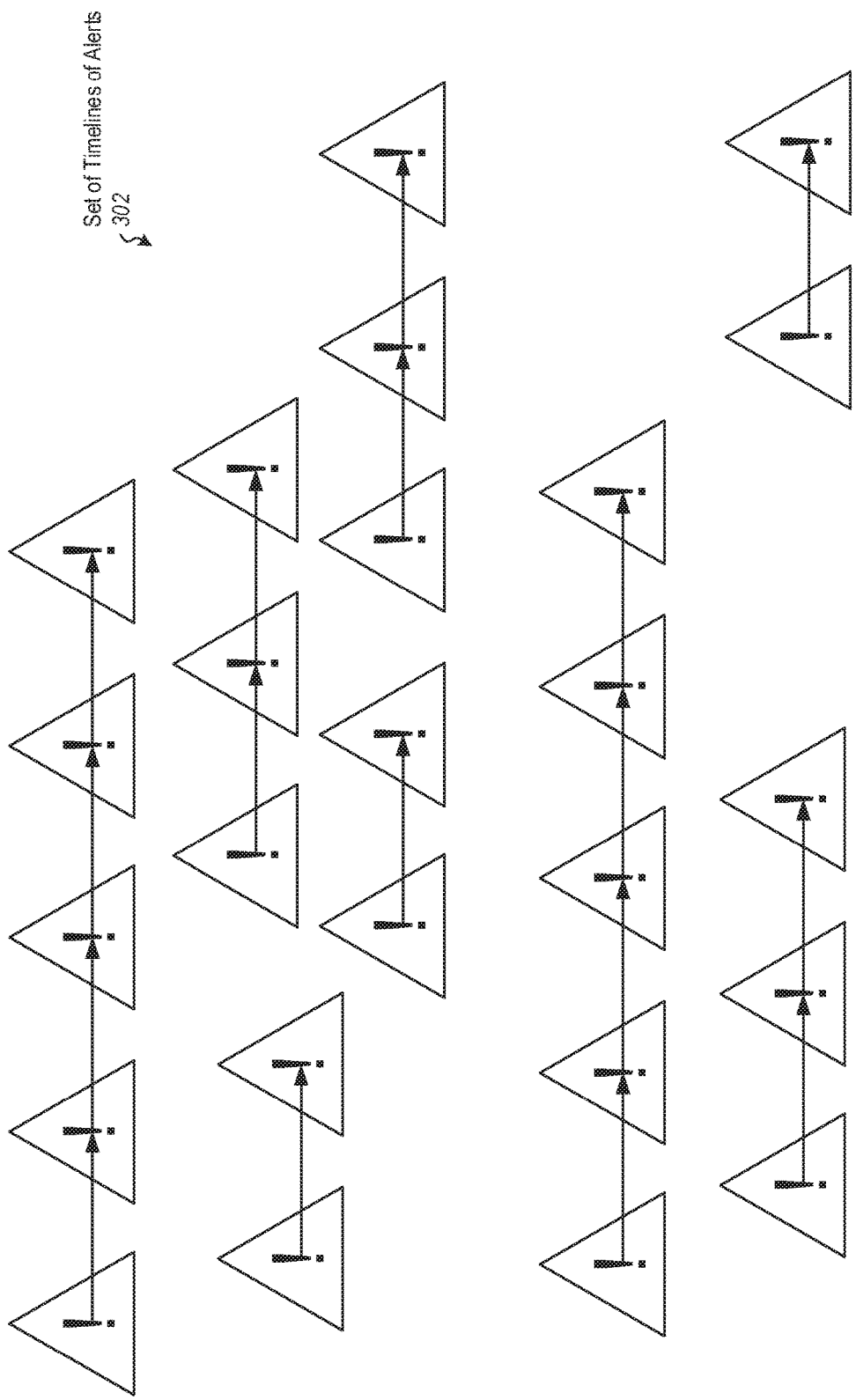
FIG. 3 illustrates timelines of alerts.

Referring now to FIG. 3, various pattern discovery acts are illustrated. In particular, FIG. 3 illustrates a set of timelines of alerts 302. The set of timelines of alerts 302 includes timelines of alerts organized on a network entity basis. Network entities are represented as network nodes in FIG. 1. Such network entities may be for example services, such as cloud services, virtual machines, virtual networks, or other network entities. In particular, for a given network entity, one or more timelines of alerts are created from the alerts collected at the data store 112, where a given timeline includes alerts, over time, for a given network entity. That is, a given timeline contains a collection of alert instances ordered according to the time when the alerts were generated and correlated with a particular network entity.

Additionally, each alert instance includes various properties. For example, one such property may be a type of alert. The type of alert defines the root cause for the alert being generated. The type of alert is defined by the event(s) causing the alert to be generated. For example, the type may identify that the alert was generated as a result of: an attempted brute force attack, a virus attack, a Distributed Denial of Service (DDoS) attack, an attempted software installation, the machine communicating with known malicious servers, a reconnaissance phase operation, a malware protection event, an attempt by an entity to look for hosted pages, an attempt by an entity to enumerate open ports, etc. Each of the alert instances may further include properties such as one or more destination IP addresses, one or more source IP addresses, one or more user names, one or more file names, one or more uniform resource indicators (URIs), one or more processes running on a virtual machine, type of malware or virus detected, etc.

Embodiments further include functionality for pattern discovery. In particular, security knowledge is used to identify possible patterns of attacks on each timeline. Note that each timeline corresponds to a single cloud service, virtual machine or other network entity. FIG. 1 illustrates a pattern generator 116 that can use various rules to identify patterns of alerts, group patterns of alerts into groups, and, in some embodiments, filter out invalid groups.

Figure 4:
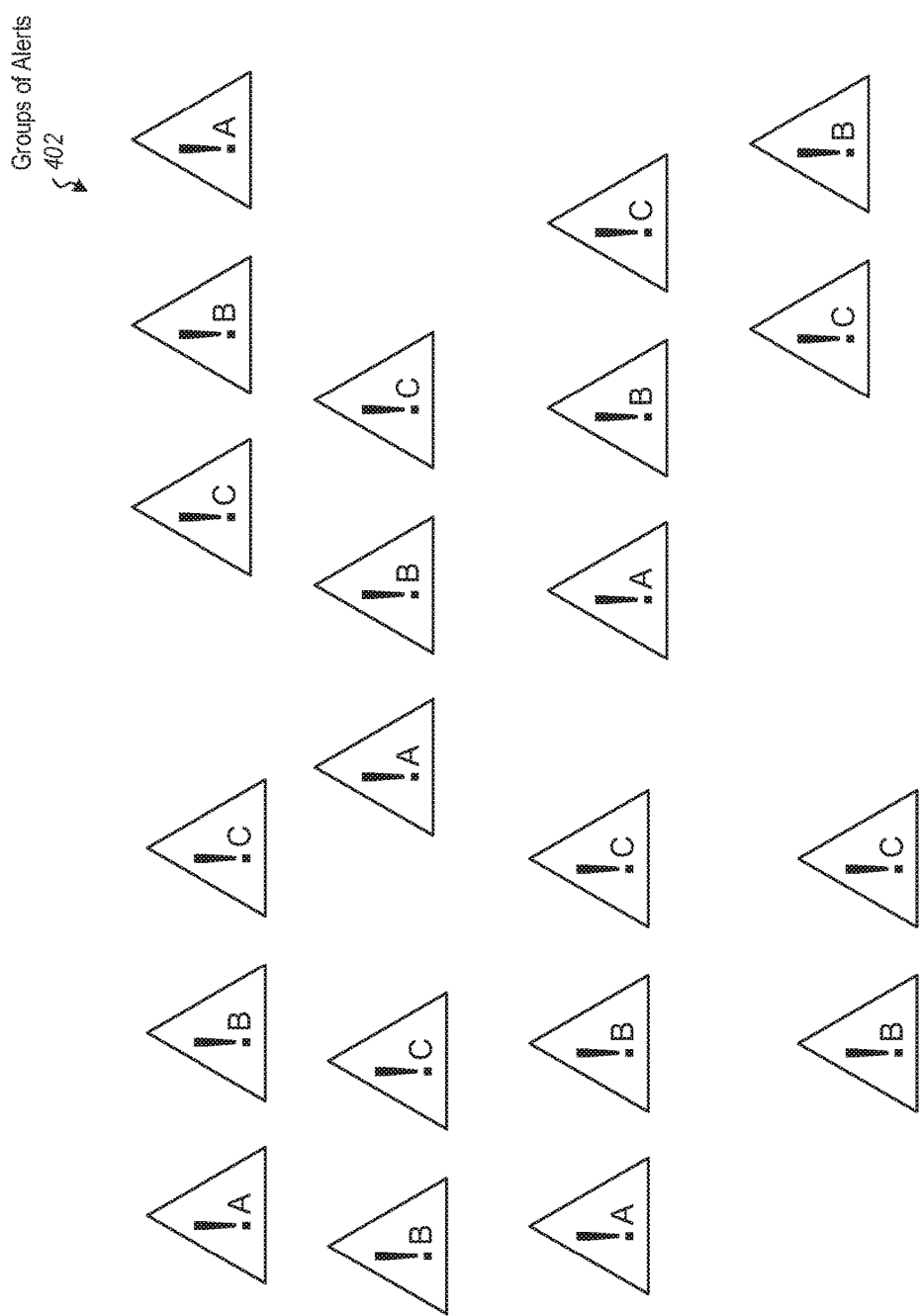
FIG. 4 illustrates groups of alerts.

In some embodiments, the patterns are not required to represent validated attacks at this point and serve only as an intermediate step to rule out patterns which are obviously unlikely to represent an attack. FIG. 4 illustrates a number of examples. In particular FIG. 4 illustrates groups of alerts 402.

Groups of alerts can be generated in a number of different fashions. For example, in some embodiments, all alerts on a timeline of alerts may be included in a group of alerts.

Alternatively or additionally, a sliding window of a predetermined number of alerts along a timeline of alerts may be used to create a group of alerts. The sliding window may move one alert at a time to create various groups of alerts with overlapping alerts. An overlapping alert is one that is included in multiple different groups. Alternatively or additionally, the sliding window may slide multiple alerts along a given time line to create groups of alerts but which still may have alerts that are overlapping with other groups of alerts. Alternatively or additionally, the sliding window may slide sufficiently such that different groups of alerts from the same time line do not include overlapping alerts.

Alternatively or additionally, a group of alerts may be created by randomly sampling and selecting different alerts along a timeline of alerts.

Alternatively or additionally, a group of alerts may be created by selecting a single instance for each type of alert on a timeline and including that alert in the group of alerts. The single instance may be collected in a number of different fashions. For example, the first instance of the type of alert that occurs along a timeline of alerts may be selected to be included in a group of alerts. Alternatively or additionally, a random alert from among a type of alert may be selected for inclusion in the group of alerts. Alternatively or additionally, some other selection process may be used to select an alert of a particular type for inclusion in a group of alerts.

Alternatively or additionally, a group of alerts may be created based on a time period. For example, alerts on a network entity to occur within a 5 minute window may be included in a group of alerts.

As illustrated in FIG. 2 at 203, initial filtering can be performed. The groups in the groups of alerts can be initially filtered in a number of different ways. Note filtering, as used herein may be used in alert creation. That is, filtering may include excluding certain already formed groups, may include inclusion of certain already formed groups, and/or may include action used to create groups. In some embodiments, alerts can be filtered using one or more of the following approaches:

In some embodiments, filtering of groups can be accomplished using rules created by security experts. For example, using security experts' knowledge of attack characteristics, predefined correlation rules can be defined to look for specific alerts patterns (which in some embodiments, may be alert sequences over time) over the alert timeline reported for each network entity. Thus, a group of alerts, as shown in FIG. 4, is typically a time ordered group of alerts grouped and created such that the group of alerts meets some predefined (or learned) rule when organized into a group pattern.

Additionally or alternatively, group patterns may be filtered using various machine learning methods. For example, embodiments may generate or allow new alert patterns by learning existing alert patterns.

For example, embodiments may be implemented using users' feedback to learn which alert patterns are real attacks and allow that patterns to be included in the groups of alerts and filtering out alert patterns which statistically are most likely not real attacks. The feedback can be received through a button or set of buttons in a user interface with two options. A 'yes' option selectable by a user allows the user to indicate that a group of alerts looks like an authentic attack, while a 'no' option allows the user to indicate that a group of alerts does not look like an authentic attack. This feedback can be used later as labeled data in a machine learning system to create a scoring model that will increase the score of users validated alert patterns and decrease the score of alert patterns that users marked as not representing a real attack. In some embodiments, a threshold can be used to generate a decision to accept an alert pattern of a group of alerts having some threshold probability of being indicative of an attack.

Another example is to provide a machine learning system with patterns that security experts have defined and use these received patterns as labeled data in machine learning systems to allow, in the filtering process, new groups of alerts corresponding to the patterns accordingly. This can be done by calculating edit distances between patterns and adding new patterns which are close enough to the patterns that the security experts defined.

In yet another alternative or additional embodiment, embodiments may cluster existing patterns and then classify new potential patterns to one of the clusters if the distance in the features space is short enough.

As illustrated in FIG. 2, after pattern discovery is performed, kill chain filtering, as illustrated at 204, can be performed. In some embodiments, embodiments may exclude groups which include alert patterns with contradicting cyber-kill chain information. For example, some embodiments may exclude groups which include alert patterns for which no cyber-kill-chain can be identified or for which the alert pattern would contradict a valid cyber-kill chain. For example, consider a case where an alert pattern indicates infection of a machine followed an initial access of the machine. This would contradict a cyber-kill chain as the initial access is typically followed by the infection.

Figure 5:
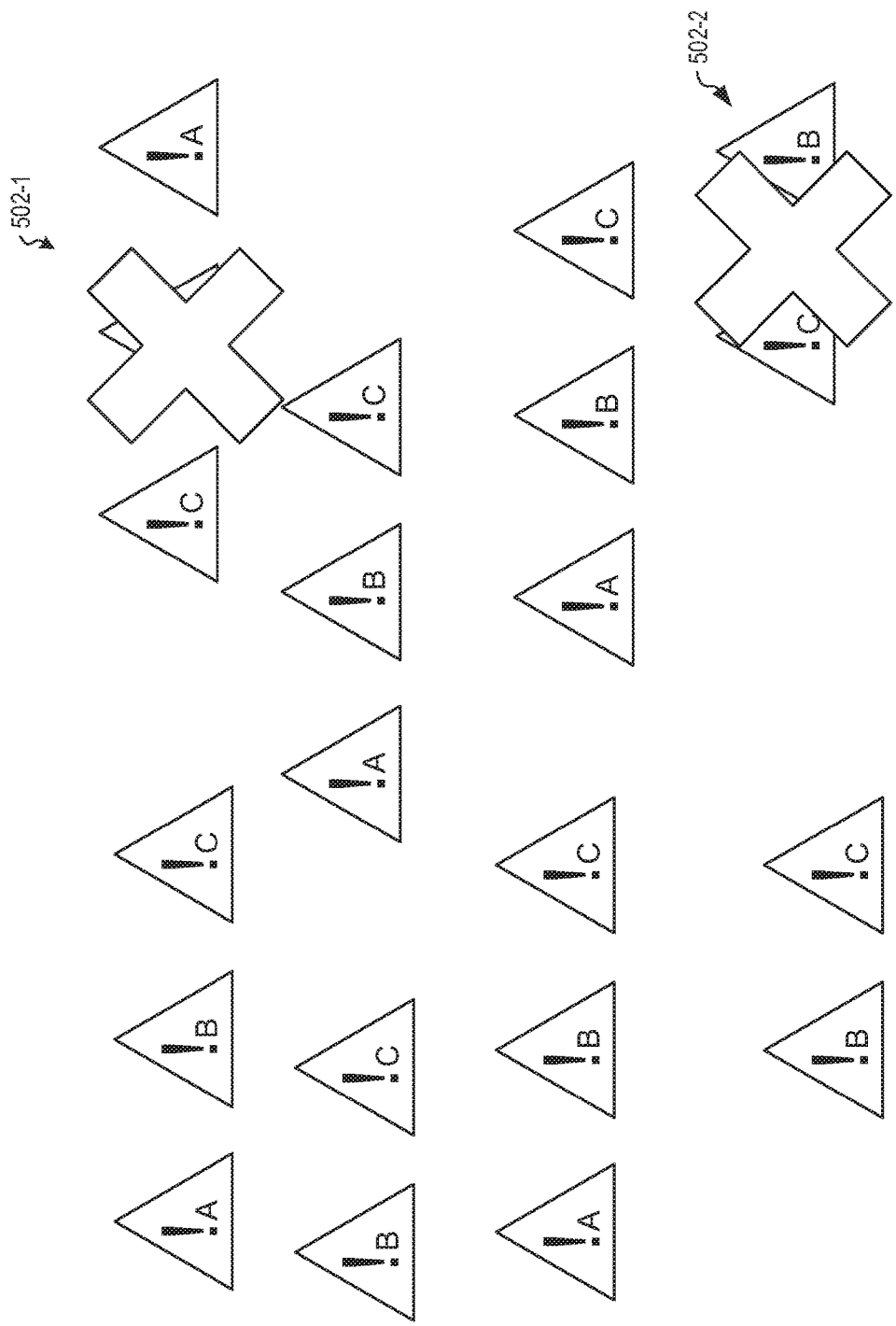
FIG. 5 illustrates kill-chain filtering of alerts.

Thus, as illustrated in FIG. 5, patterns can be filtered out when they do not meet certain cyber-kill chain requirements as described above. In particular, FIG. 5 illustrates groups 402-1 and 402-1 that are filtered from the groups of alerts 402 as a result of not meeting cyber-kill chain requirements.

In particular, each of group of alerts in the groups of alerts has a heterogeneous set of alerts. That is, each particular group will have alerts that belong to different types of alerts. Such types may be, for example, alerts generated as a result of an attempted brute force attack, alerts generated as a result of a virus attack, alerts generated as a result of a Distributed Denial of Service (DDoS) attack, alerts generated as a result of an attempted software installation, alerts generated as a result of the machine communicating with known malicious servers, alerts generated as a result of a reconnaissance phase operation, alerts generated as a result of a malware protection event, alerts generated as a result of an attempt by an entity to look for hosted pages, alerts generated as a result of an attempt by an entity to enumerate open ports, or other such actions. When the group of alerts do not match a valid cyber-kill chain, then that group of alerts is filtered out as illustrated in FIG. 5.

Thus, embodiments may correlate alerts together if they adhere to cyber-kill-chain stages and show a progression of an attack life cycle. In some embodiments, this involves mapping each alert to a stage in the kill chain and looking for sub-sequences of alerts among with alerts timeline per network entity that does not contradict the chronological order of attack progressing. For example, a contradiction to the cyber-kill chain stages would be a sub sequence of alerts containing alerts for a malicious process detected on the virtual machine followed by an infiltration attempt. For example, for a virtual machine that is already compromised, the attacker trying to infiltrate the machine (the alert received later in the timeline) is most probably not the same attacker who installed the malicious process.

Involving the cyber-kill chain helps to produce subsequences of alerts that would be latter correlated across different network entities by looking for patterns similarities. This is an approach that is both generic and can highlight sub sequences that are not pre-defined and adhere to a known attack pattern but can also highlight patterns of alerts which might otherwise go undetected. Using the cyber-kill-chain to filter unlikely attack patterns allows embodiments to use a generic approach for patterns discovery which does not rely on pre-determined rules while eliminating most of the patterns that originate from interleaving internet "noise" alerts.

This nonetheless allows "weak" patterns to be flooded to the pattern clustering as described below. This is done to increase the diversity of the building blocks for the cyber-kill chain filtering, which will filter out weak clusters.

The following now illustrates details with respect to pattern group clustering as illustrated at 208 in FIG. 2.

Figure 6:
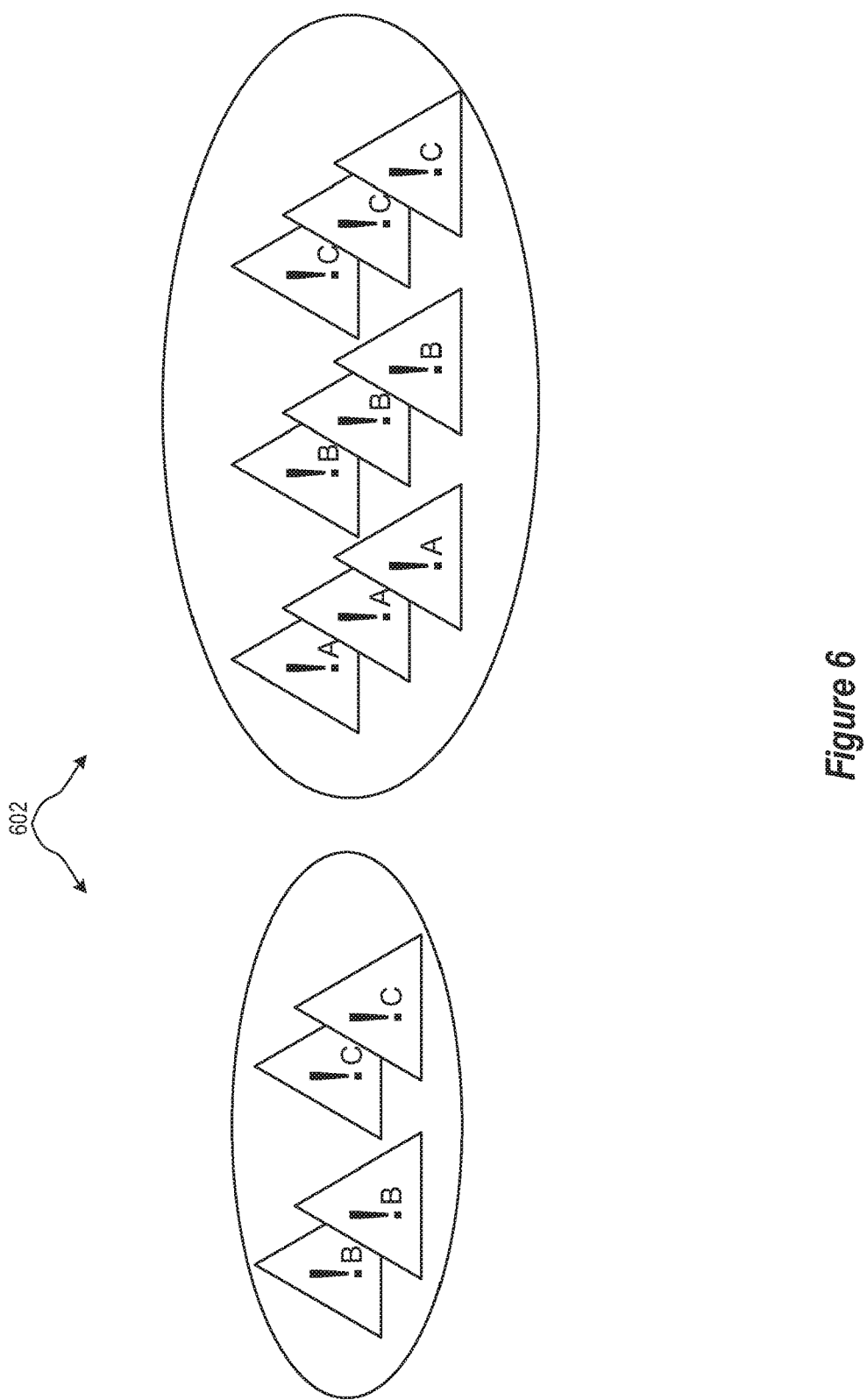
FIG. 6 illustrates clustering groups of alerts.

As illustrated in FIG. 2 at 208 and in FIG. 6, any remaining groups of alerts can be clustered into clusters 602. For example, the cluster generator 118 may be used to cluster groups of alerts. In group clustering, all of the candidate groups discovered previously, have clustering techniques over them to group them by similarity. The similarity check can be done by various methods such as calculating edit distance, using clustering approaches like DBSCAN or K-means, by utilizing genetics sequence motif approaches, etc. Thus, while the clusters 602 illustrated in FIG. 6 show that the alert pattern groups are identical in each cluster 602, it should be appreciated that in other embodiments, a given cluster may include groups that are somewhat disparate within some predetermined threshold.

Notice that overlap between clusters is allowed, meaning a specific alert or pattern of alerts can be included in several clusters. The next step will verify that a cluster of patterns is an attack.

Embodiments further include functionality for incident generation to provide alerts as illustrated at 208.

An incident generator 120 (see FIG. 1) may perform incident generation by examining a cluster of alert groups and deciding whether the correlation between the alert groups is statistically significant and whether the cluster should be presented to the users as an attack incident. This can be achieved by also taking into considering cluster metadata such as variance of group length, number of repetitions of a given group, etc.

Eventually, a set of statistically significant clusters is produced. Each cluster represents a certain attack, each group in the cluster represents an incident which is composed of several alerts. This causes a notification to be generated and provided to nodes in the set of network nodes 104 that are affected by the attack, as indicated by the nodes being associated with groups in a cluster that is identified as being representative of an attack.

Consider the following example: The pattern generator 116 (see FIG. 1) finds a group corresponding to a pattern in one of the virtual machines that was created by using kill-chain security knowledge but the pattern was found only in this group on this virtual machine without any similar groups with similar or identical patterns on this or other machines. This group will not be clustered with other groups. Therefore, it will not be translated to an incident and will not be presented to the customer.

In another example, the pattern generator 116 found the same pattern in groups on a few dozen virtual machines, as well as a few other sufficiently similar patterns for groups within some predetermined threshold. The cluster generator 118 will cluster the groups together. The incidence generator 120 will raise a high significance cluster and all of the network entities (i.e., the appropriate network nodes from the set of network nodes 104) with these patterns will receive an incident alerting of a potential attack. The network entities can then mitigate the attack by blocking network access, performing cleaning operations, etc. This will allow each customer to see their related alerts and use them to mitigate attacks.

Thus embodiments facilitate the comparison of alerts sequence patterns in incident groups across entities on a network based on sequences similarity. Where entities could be virtual machines, virtual networks, services, or any other entity that it being alerted on.

Additionally, entities can mitigate attacks in various ways. For example, entities may prevent communications to or from certain other network entities. Additionally are alternatively, entities can perform cleansing operations to attempt to remove malicious software. This may be performed in a precise fashion such as by identifying software elements that belong to a malicious software application. Alternatively or additionally, embodiments may cleanse network entities by wiping the network entities completely and restoring the network entities to a clean state. Although not to shown here, other cleansing operations may alternatively or additionally be performed.

Figure 7:
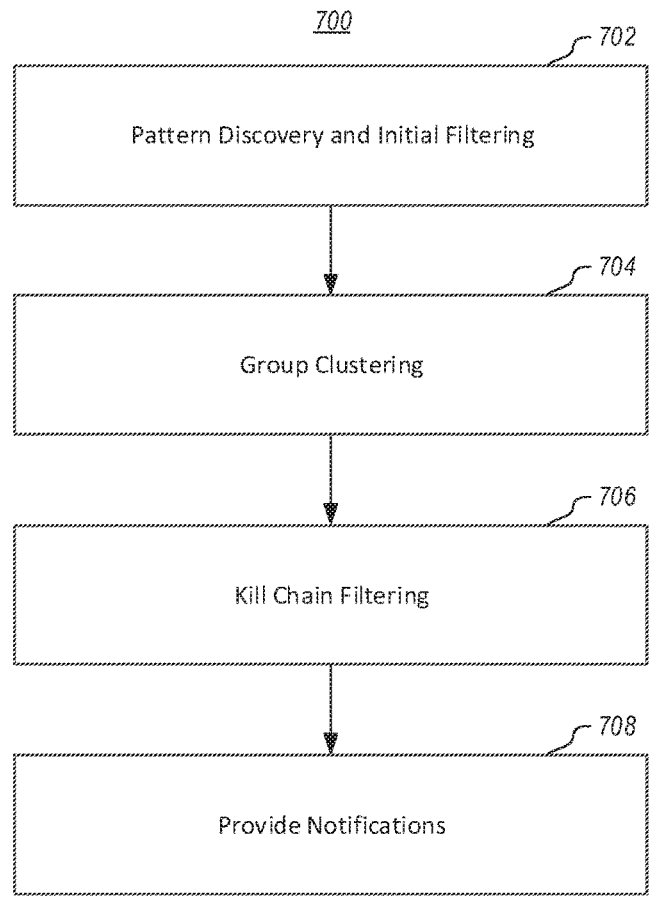
FIG. 7 illustrates an alternate flow for providing notifications of attacks.
Figure 8:
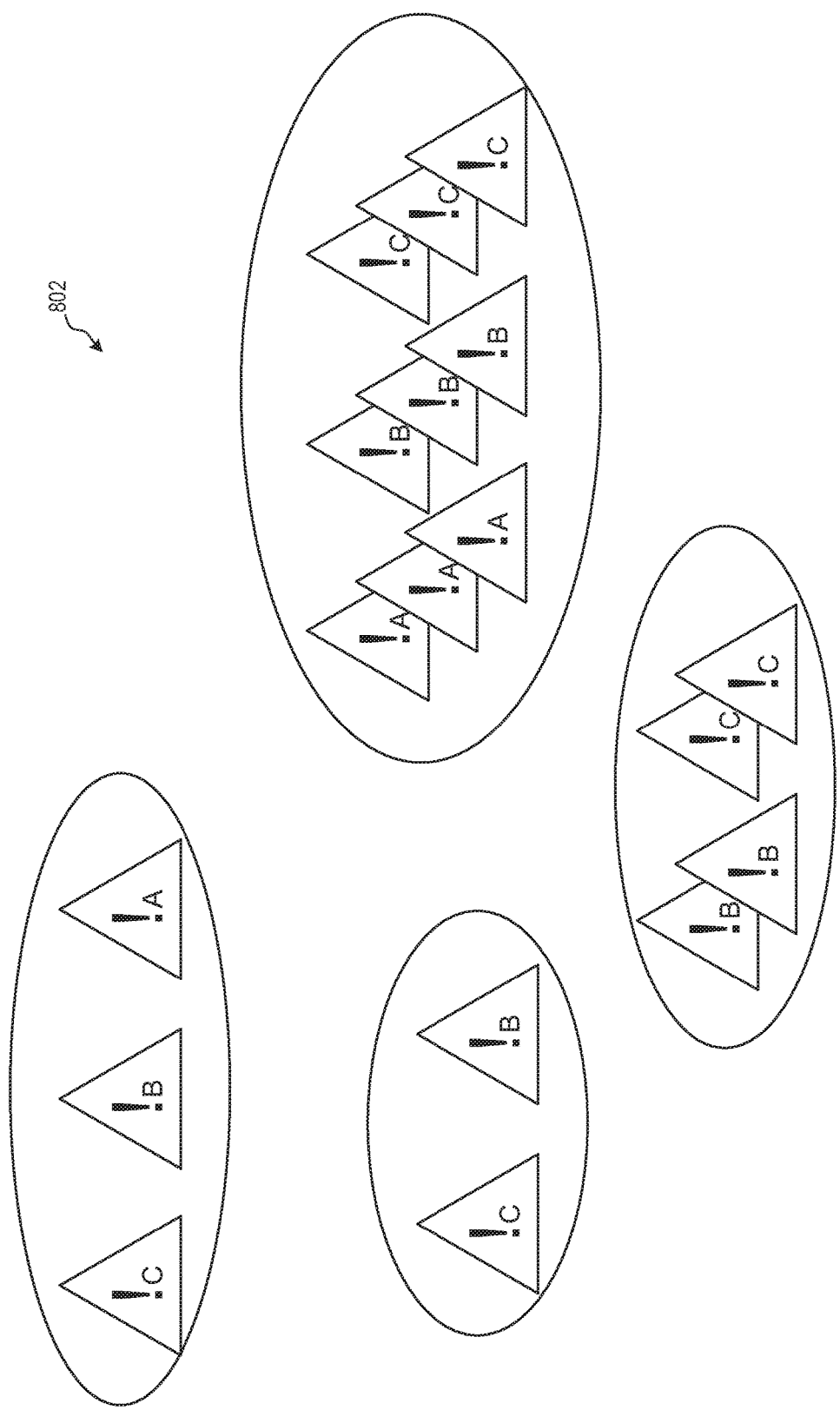
FIG. 8 illustrates an alternative method of clustering groups of alerts.
Figure 9:
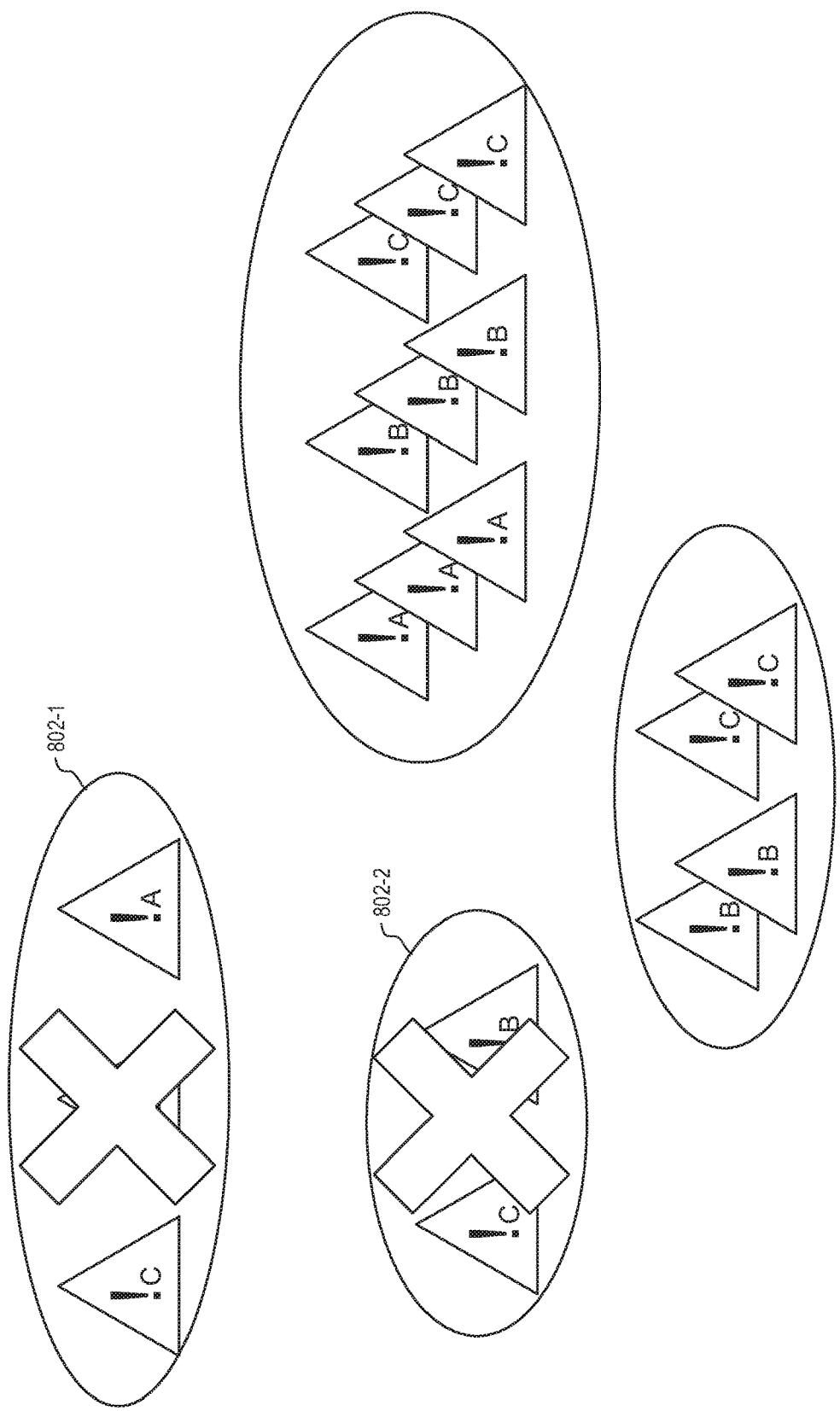
FIG. 9 illustrates an alternative method of kill-chain filtering.

Referring now to FIG. 7 an alternative flow 700 is illustrated. FIG. 7 illustrates that pattern discovery and initial filtering can be performed as illustrated at 702. However, in the example illustrated and FIG. 7, group clustering as illustrated at 704 is performed after the pattern discovery and initial filtering. As illustrated in FIG. 8, this causes the clusters of groups 802 as shown. Referring once again to FIG. 7, at 706 kill chain filtering is performed. Thus, in some embodiments, kill chain filtering can be performed after group clustering has been performed. Thus as illustrated in FIG. 9 clusters 802-1 and 802-2 can be filtered using the kill chain filtering process as described previously herein. As illustrated in FIG. 7 at 708, notifications can be provided to various network entities in a fashion similar to that described above.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
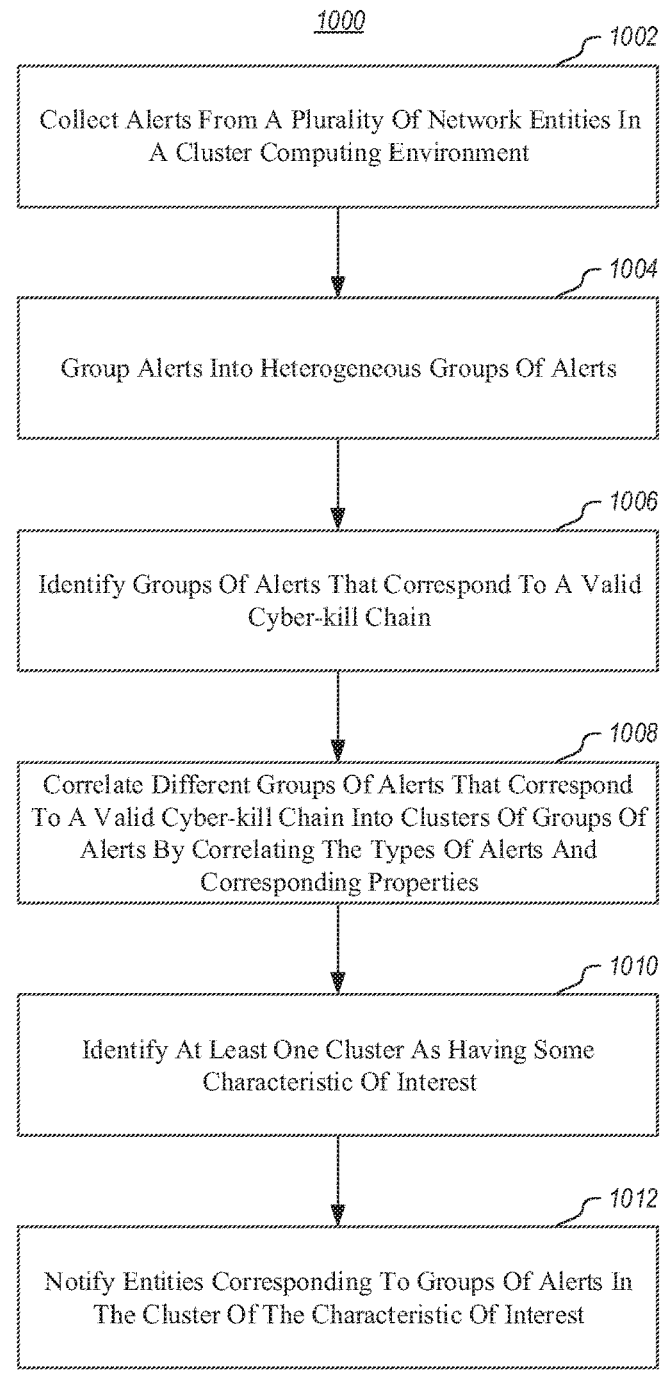
FIG. 10 illustrates a method of providing network entities with notifications of attacks on the entities.

Referring now to FIG. 10, a method 1000 is illustrated. The method 1000 may be practiced in a cluster computing environment, such as a cloud environment, an on-premises environment, or a hybrid of the two. The method includes acts for providing network entities with notifications of attacks on the entities. The method includes collecting alerts from a plurality of network entities in a cluster computing environment (act 1002). For example, the network appliance 108-1 may include an alert collector 114-1 configured to collect alerts from network nodes in the set of network nodes 104.

The method 1000 may further include grouping alerts into heterogeneous groups of alerts (act 1004). Each group includes a plurality of different types of alert. Each alert has corresponding properties, including at least one property identifying the type of alert. Each group of alerts corresponds to a timeline of alerts for a particular entity. For example, as illustrated in FIG. 4, groups of alerts are formed. The groups have different types of alerts in them. The groups are formed from timelines of alerts, such as those illustrated in FIG. 3. Each timeline of alerts corresponds to a particular entity, such as a particular network node.

The method 1000 further includes identifying groups of alerts that correspond to a valid cyber-kill chain (act 1006). Note that this can be done before clustering as illustrated in FIG. 5 or after clustering as illustrated in FIG. 9.

The method 1000 further includes correlating different groups of alerts that correspond to a valid cyber-kill chain into clusters of groups of alerts by correlating the types of alerts and corresponding properties (act 1008). This is illustrated in two different embodiments in FIGS. 6 and 9.

The method 1000 further includes identifying at least one cluster as having some characteristic of interest (act 1010). For example, embodiments may identify a cluster as corresponding to an attack on a node.

The method 1000 further includes notifying entities corresponding to groups of alerts in the cluster of the characteristic of interest (act 1012). For example, each group in the cluster corresponds to an entity. If the cluster is identified as corresponding to an attack of some sort, the entities corresponding to groups in the cluster can be identified and notified of the attack.

The method 1000 may be practiced where the types of alerts correspond to links in a cyber-kill chain. For example, alerts may include a type property that identifies it as an initial access of a machine, infection of a machine, or other activity corresponding to a link in a cyber-kill chain.

The method 1000 may further include identifying at least one group of alerts as white noise or internet noise.

The method 1000 may further include identifying at least one cluster as white noise or internet noise.

The method 1000 may be practiced where heterogeneous groups of alerts are created using expert defined rules.

The method 1000 may be practiced where heterogeneous groups of alerts are created using machine learning rules.

The method 1000 may be practiced where heterogeneous groups of alerts are created using user feedback.

The method 1000 may further include filtering groups of alerts based on the types being logically inconsistent. For example, some groups may have elements of the cyber kill chain occurring in an order that would not consistent with an attack.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for providing network entities with notifications of attacks on the entities, the system comprising:
   a data store;
   one or more processors; and
   one or more computer-readable media having stored thereon instructions that are executable by the one or more processors, and that when executed by the one or more processors, implement the following:
      one or more alert collectors coupled to the data store and configured to collect alerts from a plurality of network entities in a cluster computing environment and to store the alerts in the data store;
      a pattern generator coupled to the data store configured to receive alerts and to group alerts into heterogeneous groups of alerts, each group comprising a plurality of different types of alerts, each alert having corresponding properties, including at least one property identifying the type of alert, and wherein each group of alerts comprises a sequence order of alerts for a particular entity;
      a cluster generator configured to identify groups of alerts that correspond to a valid cyber-kill chain having a sequence order of alerts for a valid cyber kill chain, by filtering out groups of alerts that do not have a sequence order of alerts for a valid cyber kill chain and correlate different groups of alerts that correspond to a valid cyber-kill chain into clusters of groups of alerts by correlating the types of alerts and corresponding properties; and
      an incident generator configured to identify at least one cluster as having some characteristic of interest and to notify an entity corresponding to a group of alerts in the cluster of the characteristic of interest.

2. The system of claim 1, wherein the types of alerts correspond to links in a cyber-kill chain.

3. The system of claim 1, wherein the incident generator is configured to identify at least one group of alerts as white noise or internet noise.

4. The method of claim 1, wherein the incident generator is configured to identify at least one cluster as white noise or internet noise.

5. A computer system comprising:
   one or more processors; and
   one or more computer-readable media having stored thereon instructions that are executable by the one or more processors to configure the computer system to provide network entities with notifications of attacks on the entities, the computer system, including instructions that are executable to configure the computer system to perform at least the following:
      collecting alerts from a plurality of network entities in a cluster computing environment;
      grouping alerts into heterogeneous groups of alerts, each group comprising a plurality of different types of alerts, each alert having corresponding properties, including at least one property identifying the type of alert, and wherein each group of alerts comprises a sequence order of alerts for a particular entity;

identifying groups of alerts that correspond to a valid cyber-kill chain having a sequence order of alerts for a valid cyber kill chain, by filtering out groups of alerts that do not have a sequence order of alerts for a valid cyber kill chain;

correlating different groups of alerts that correspond to a valid cyber-kill chain into clusters of groups of alerts by correlating the types of alerts and corresponding properties;

identifying at least one cluster as having some characteristic of interest; and notifying an entity corresponding to a group of alerts in the cluster of the characteristic of interest.

6. The computer system of claim 5, wherein the types of alerts correspond to links in a cyber-kill chain.

7. The computer system of claim 5, wherein one or more computer-readable media further have stored thereon instructions that are executable by the one or more processors to configure the computer system to identify at least one group of alerts as white noise or internet noise.

8. The computer system of claim 5, wherein one or more computer-readable media further have stored thereon instructions that are executable by the one or more processors to configure the computer system to identify at least one cluster as white noise or internet noise.

9. The computer system of claim 5, wherein the system is configured to create heterogeneous groups of alerts using expert defined rules.

10. The computer system of claim 5, wherein the system is configured to create heterogeneous groups of alerts using machine learning rules.

11. The computer system of claim 5, wherein the system is configured to create heterogeneous groups of alerts using user feedback.

12. The computer system of claim 5, wherein one or more computer-readable media further have stored thereon instructions that are executable by the one or more processors to configure the computer system to filter groups of alerts based on the types having logical inconsistencies.

13. In a cluster computing environment a method of providing network entities with notifications of attacks on the entities, the method comprising:

collecting alerts from a plurality of network entities in a cluster computing environment;

grouping alerts into heterogeneous groups of alerts, each group comprising a plurality of different types of alerts, each alert having corresponding properties, including at least one property identifying the type of alert, and wherein each group of alerts comprises a sequence order of alerts for a particular entity;

identifying groups of alerts that correspond to a valid cyber-kill chain having a sequence order of alerts for a valid cyber kill chain, by filtering out groups of alerts that do not have a sequence order of alerts for a valid cyber kill chain;

correlating different groups of alerts that correspond to a valid cyber-kill chain into clusters of groups of alerts by correlating the types of alerts and corresponding properties;

identifying at least one cluster as having some characteristic of interest;

notifying an entity corresponding to a group of alerts in the cluster of the characteristic of interest.

14. The method of claim 13, wherein the types of alerts correspond to links in a cyber-kill chain.

15. The method of claim 13, further comprising identifying at least one group of alerts as white noise or internet noise.

16. The method of claim 13, further comprising identifying at least one cluster as white noise or internet noise.

17. The method of claim 13, wherein heterogeneous groups of alerts are created using expert defined rules.

18. The method of claim 13, wherein heterogeneous groups of alerts are created using machine learning rules.

19. The method of claim 13, wherein heterogeneous groups of alerts are created using user feedback.

20. The method of claim 13, further comprising filtering groups of alerts based on the types having logical inconsistencies.

* * * * *